(12) United States Patent
Lefebvre et al.

(10) Patent No.: US 10,808,573 B1
(45) Date of Patent: Oct. 20, 2020

(54) BEARING HOUSING WITH FLEXIBLE JOINT

(71) Applicant: PRATT & WHITNEY CANADA CORP., Longueuil (CA)

(72) Inventors: Guy Lefebvre, St-Bruno-de-Montarville (CA); Remy Synnott, St-Jean-sur Richelieu (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 16/369,632

(22) Filed: Mar. 29, 2019

(51) Int. Cl.
  *F16C 27/04* (2006.01)
  *F01D 25/16* (2006.01)
  *F01D 5/02* (2006.01)
  *F16C 19/16* (2006.01)

(52) U.S. Cl.
  CPC ............ *F01D 25/164* (2013.01); *F01D 5/027* (2013.01); *F05D 2220/32* (2013.01); *F05D 2240/54* (2013.01); *F05D 2240/91* (2013.01); *F05D 2260/15* (2013.01); *F16C 19/16* (2013.01); *F16C 2360/23* (2013.01)

(58) Field of Classification Search
  CPC ...... F01D 25/16; F01D 25/162; F01D 25/164; F05D 2240/54; F16C 19/54; F16C 19/546; F16C 2360/23
  See application file for complete search history.

(56) References Cited

U.S. PATENT DOCUMENTS

| | | | |
|---|---|---|---|
| 4,304,522 A | 12/1981 | Newland | |
| 5,433,584 A | 7/1995 | Amin et al. | |
| 5,974,782 A | 11/1999 | Gerez | |
| 6,109,022 A * | 8/2000 | Allen | F01D 5/025 60/223 |
| 6,679,045 B2 | 1/2004 | Karafillis et al. | |
| 6,786,642 B2 | 9/2004 | Dubreuil et al. | |
| 7,100,358 B2 | 9/2006 | Gekht et al. | |
| 7,950,236 B2 | 5/2011 | Durocher et al. | |
| 8,128,339 B2 | 3/2012 | Kondo et al. | |
| 8,282,285 B2 | 10/2012 | Brillon | |
| 8,337,090 B2 | 12/2012 | Herborth et al. | |
| 8,534,076 B2 | 9/2013 | Woodcock et al. | |
| 8,777,490 B2 | 7/2014 | Turbomeca et al. | |
| 9,194,253 B2 | 11/2015 | Turbomeca et al. | |
| 9,447,817 B2 | 9/2016 | Gallimore et al. | |
| 9,476,320 B2 | 10/2016 | Savela | |
| 9,702,404 B2 | 7/2017 | Smedresman et al. | |
| 9,829,037 B2 | 11/2017 | Gallimore et al. | |
| 9,909,451 B2 | 3/2018 | Carter et al. | |
| 10,415,481 B2 | 9/2019 | Grogg et al. | |
| 10,436,065 B2 | 10/2019 | DiBenedetto | |
| 10,502,081 B2 | 12/2019 | Bioud et al. | |
| 10,513,938 B2 | 12/2019 | Witlicki et al. | |
| 10,519,804 B2 | 12/2019 | Van Den Berg | |

(Continued)

*Primary Examiner* — Phillip A Johnson
(74) *Attorney, Agent, or Firm* — Norton Rose Fulbright Canada LLP

(57) ABSTRACT

There is disclosed a gas turbine engine including a bearing housing having at least two bearings axially spaced from one another relative to a central axis. The bearing housing has a case between the at least two bearings having a joint configured for relative axial movement between the bearing supports. A method of operating a bearing assembly including the bearing housing is also disclosed.

20 Claims, 3 Drawing Sheets

(56) References Cited

U.S. PATENT DOCUMENTS

| | | | |
|---|---|---|---|
| 2005/0254945 A1* | 11/2005 | VanDuyn | F01D 21/08 415/229 |
| 2008/0063333 A1 | 3/2008 | Bruno et al. | |
| 2017/0198604 A1 | 7/2017 | Lefebvre et al. | |
| 2017/0234157 A1 | 8/2017 | Khan et al. | |
| 2019/0195088 A1 | 6/2019 | Duffy et al. | |

* cited by examiner

BEARING HOUSING WITH FLEXIBLE JOINT

TECHNICAL FIELD

The application relates generally to gas turbine engines and, more particularly, to bearing housing assemblies used in such engines.

BACKGROUND OF THE ART

In a gas turbine engine, a rotary shaft holding compressor/fan and turbine blades is rotatably mounted within a casing via bearings. The bearings are typically located radially inwards relative to the annular flow path formed by duct walls of the casing. A bearing housing usually encloses the bearings and defines a bearing cavity for receiving lubricant for lubricating the bearings. Due to the forces inherent to gas turbine engine operation, and as they are the interface between shafts and a support structure, the bearings are exposed lo loads, vibrations, etc that may affect their performance over time.

SUMMARY

In one aspect, there is provided a gas turbine engine comprising a bearing housing having at least two bearings axially spaced from one another relative to a central axis, the bearing housing having a case between the at least two bearings having a joint configured for relative axial movement between the bearing supports.

In another aspect, there is provided a gas turbine engine comprising a shaft rotatable about a central axis, the shaft supported by at least two bearings supported by a common bearing housing, the bearing housing having a case including an elbow section located between the at least two bearings forming a joint allowing relative axial movement between the bearing supports.

In yet another aspect, there is provided a method of operating a bearing assembly for a gas turbine engine, comprising: supporting at least two bearings being axially spaced apart relative to a central axis; receiving a first axial load at least at one of the at least two bearings and receiving a second axial load greater than the first axial load at the other of the at least two of the bearings; and bending a case interconnecting the at least two bearings to axially move the at least two bearings relative to one another relative to the central axis as a result of a difference between the first axial load and the second axial load.

DESCRIPTION OF THE DRAWINGS

Reference is now made to the accompanying figures in which.

DETAILED DESCRIPTION

Figure 1:
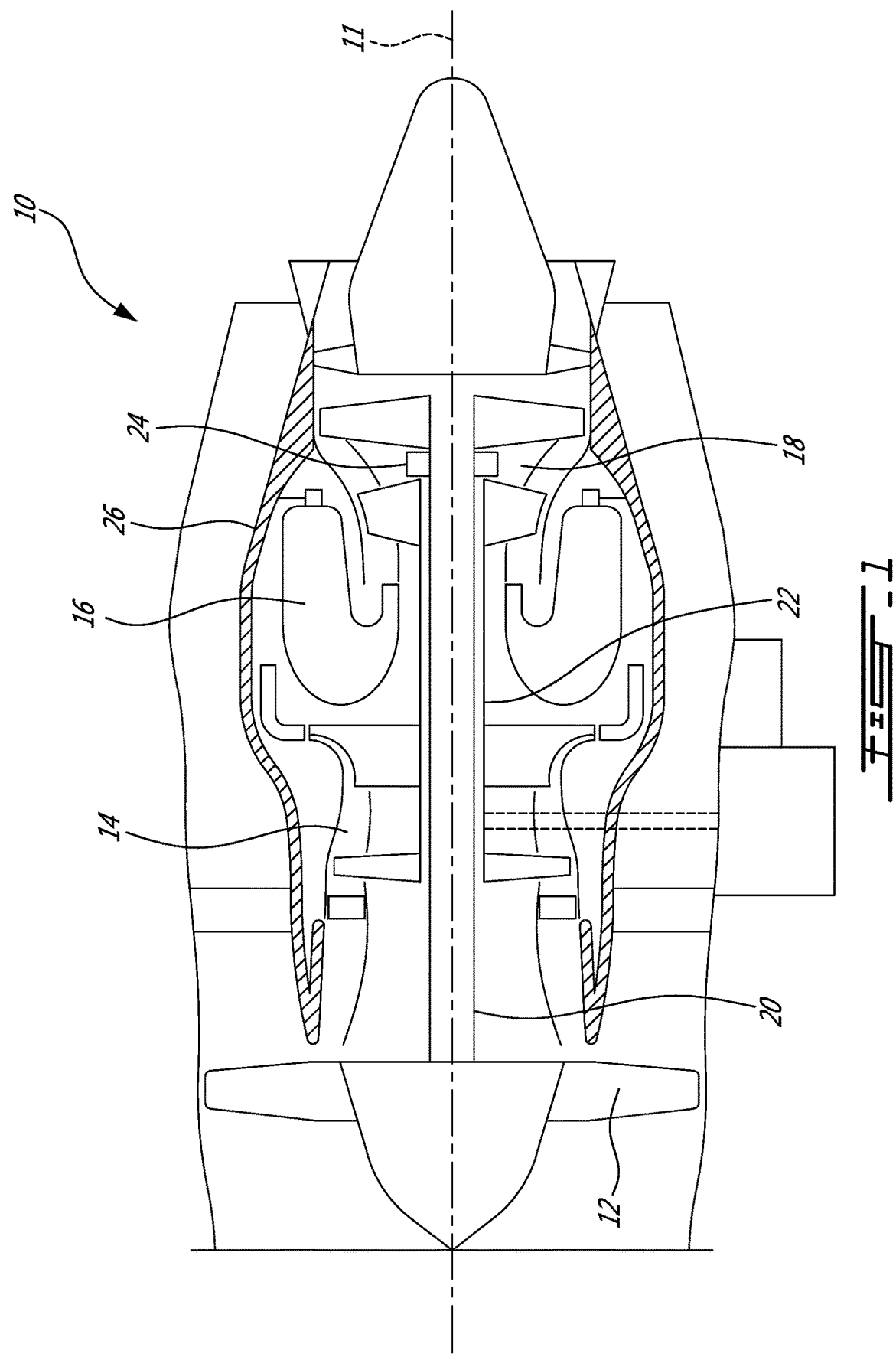
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11.

The compressor section 14, fan 12 and turbine section 18 have rotating components which can be mounted on one or more shafts 20, 22, which, in this embodiment, rotate concentrically around the central axis 11. Bearings 24 are used to provide smooth relative rotation between a shaft (20 or 22) and casings 26, 28 (FIG. 2) (non-rotating component), and/or between the two shafts 20, 22 which rotate at different speeds.

Figure 2:
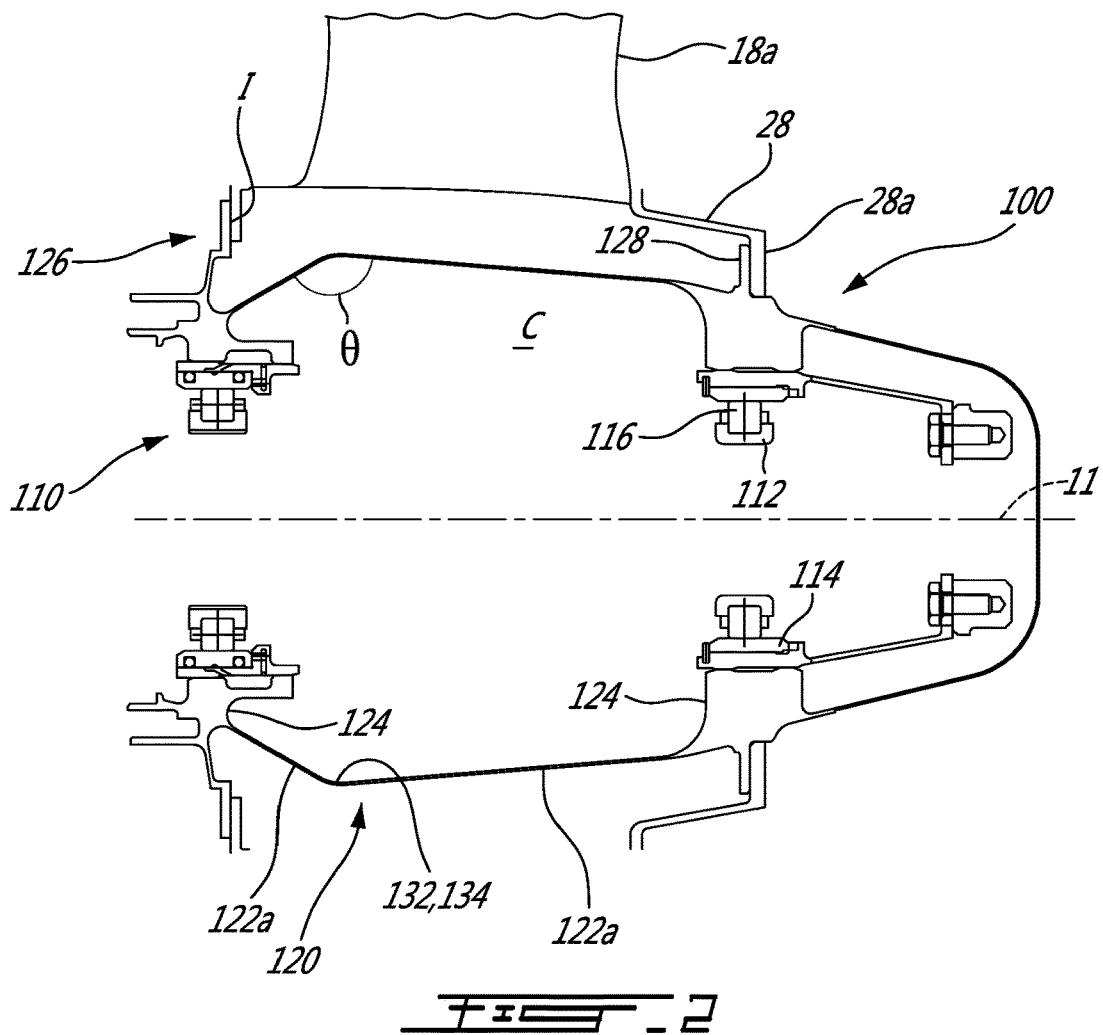
FIG. 2 is a schematic cross-sectional view of a portion of the gas turbine engine of FIG. 1 in accordance with one embodiment.

Referring now to FIG. 2, a cross-sectional view of a portion of the turbine section 18 is illustrated. A bearing assembly is generally shown at 100. The bearing assembly 100 is located radially inwardly of vanes 18a of the turbine section 18 relative to the central axis 11.

The bearing assembly 100 includes bearings 110 and a bearing housing 120 enclosing the bearings 110. The bearing housing 120 is used for defining a bearing cavity C circumferentially extending around the axis 11. The bearing cavity C is used for receiving lubricant from a lubrication system S for lubricating the bearings 110. The bearing 110 and the bearing housing 120 are described in succession herein below.

Still referring to FIG. 2, two bearings 110 are shown and are axially offset from each other relative to the central axis 11. It is understood that the gas turbine engine 10 may include more than two bearings. For the sake of clarity, only one of the two bearings 110 is described herein below using the singular form, but the description may apply to both of the bearings 110.

The bearing 110 is used to allow a rotation of the shaft 20 relative to the bearing housing 120 and to substantially maintain a radial position of the shaft 20 relative to the casing 28 of the gas turbine engine 10. The bearing 110 may include an inner race 112 secured to the shaft 20, an outer race 114 secured to the bearing housing 120 and/or rolling elements 116 located radially between the inner and outer races 112, 114. The rolling elements 116 may be spherically, cylindrically, frustoconically shaped, among examples. Any suitable bearing known in the art may be used.

Since the shaft 20 may rotate at a relatively high speed relative to the casing 28, proper lubrication of the bearings 110 may be required. As aforementioned, the lubrication system S injects the lubricant within the bearing cavity C. It might be desirable to keep the lubricant within the bearing cavity C. This function may be carried by the bearing housing 120 and sealing members (not shown).

In the depicted embodiment, the bearing housing 120 includes a case 122 that circumferentially extends all around the central axis 11. The case 122 extends at least axially relative to the axis 11 and may span a distance between the two bearings 110.

Two bearing supports 124 (or more if more bearings are present) are secured at axial extremities of the case 122. Each of the two bearing supports 124 is in engagement with a respective one of the outer races 114 of the bearings 110. The two bearing supports 124 are stiffer than the case to be able to withstand loads applied thereto from the shaft 22 via the bearing 110. In the embodiment shown, a radial thickness of the two bearing supports 124 is greater than that of the case 122. The bearings 110, and the bearing supports 124, may be spaced apart by an axial distance greater than a diameter of the shaft 22. As shown, the axial distance between the two bearing supports 124 is greater than a chord length of the vanes 18a of the turbine section 18.

The bearing housing 120 further includes securing members 126 for attaching the bearing housing 120 to the casing 26 of the gas turbine engine 10. In the embodiment shown, the securing members 126 are flanges, also referred to as hairpins, 128 extending radially outwardly from the case 122. The flanges 128 may extend circumferentially all around the central axis 11. In other words, the flanges 128 may be annular walls. Securing members 126 may have other configurations, such as tabs, non-flange annular walls, an annular bracket, etc.

The securing members 126 are configured to be secured to connecting members 28a extending radially inwardly from the casing 28. In the embodiment shown, fasteners are used to secure the securing members 126 (e.g., the flanges 128) to the connecting members 28a of the engine casing 28. Other fixation means are contemplated. In the embodiment shown, each of the securing members 126 is axially aligned with a respective one of the bearing supports 124. In the depicted embodiment, the flanges 128 extend radially outwardly from the bearing supports 124 relative to the central axis 11.

In the depicted embodiment, each of the flanges 128 is securable to a respective one of the connecting members 28a of the casing 28. Interfaces I between the flanges 128a and the connecting members 28a are located on sides of the flanges 128a that face axially rearward relative to the central axis 11. This might allow to insert the bearing housing 120 within the casing 28 in an axial direction relative to the central axis 11.

In some cases, it might be advantageous to vary the stiffness of the two bearing supports 124 of the bearing housing 120. However, increasing the stiffness of one of the two bearing supports 124 may indirectly increase that of the other. Moreover, if the two bearing supports 124 of the bearing housing 120 vary in their respective stiffness, they might react differently to temperature variations. In other words, if the bearing housing 120 is installed in the turbine section 18, one of the two bearing supports 124 might subjected to different thermal expansion than the other which might include thermal stresses. This phenomenon may be enhanced by the high temperature gradients in the turbine section 18. More specifically, the casing 28 might be more affected to the temperature of exhaust gases circulating in the turbine section 18 than the bearing housing 120 as the casing 28 is closer to the exhaust gases. This might create thermal stress.

Still referring to FIG. 2, the case 122 of the bearing housing 120 includes an elbow or joint 132 that allows relative axial movement between the bearing supports 124 and between the bearings 110. In the embodiment shown, the case 120 is axisymmetric relative to the central axis 11, though the case 120 may not be axisymmetric. In the depicted embodiment, the case is made of flexible sheet metal.

The joint 132 may be defined by a kink 134 in the case 122. In the depicted embodiment, the kink 134 is created by an intersection of two generally continuous case sections 122a that are joined together at the kink 134—in the context that the case 122 may be a monolithic piece. The case sections 122a may be frustoconical. Each of the two case sections 122a extends from a respective one of the bearing supports 124 toward the other of the bearing supports 124. The two case sections 122a define an angle θ at the kink 134.

The angle θ between the two case sections 122a is variable to allow the axial movements between the at least two bearings 110. The angle θ is oriented radially inward and is obtuse. In an embodiment, the angle θ is greater than 90 degrees and less than 170 degrees. The kink 34 may be referred to as a bend, a deflection, etc.

In the embodiment shown, the joint 132 is located at a radially-outward most location of the case 122. The joint 132 is able to move radially inwardly toward the central axis with an increase of the angle θ and with an increase of an axial distance relative to the central axis 11 between the two bearings 110. Stated differently, the case 122 is getting straighter when the axial distance between the two bearings 110 increases.

Still referring to FIG. 2, as the case 122 is flexible at the joint 132, the bearing supports 124 might be able to directly transfer radial loads from one of the bearings 110 to the casing 28 of the gas turbine engine 10 without transferring said radial loads to the other of the bearings 110.

Referring now to FIGS. 2-6, the case 122 defines apertures 122b configured for receiving bosses 136. In the embodiment shown, the apertures 122b are circumferentially equidistantly distributed about the central axis 11. Stated otherwise, a circumferential distance taken along the central axis between two adjacent ones of the apertures 122b and of the bosses 136 is constant. In other words, the case 122 is axisymmetric with the bosses 136a, 136b, 136c. As shown more specifically on FIG. 5, the bosses and apertures are spaced apart from one another by 120 degrees. The bosses 136 may be welded on the case 122.

In the depicted embodiment, three apertures 122b are defined through the case 122; each of the three apertures 122b being engaged by a respective one of an oil feed boss 136a, an oil scavenging boss 136b, and a non-functional boss 136c. The non-functional boss 136c is merely a piece of metal and might not connected to any other component of the engine 10. The non-functional boss 136 may be used to even the stress distribution by maintaining an axisymmetric architecture. In other words, a weight distribution on the bearing housing 120 may be axisymmetric because of the non-functional boss 136c.

Figure 3:
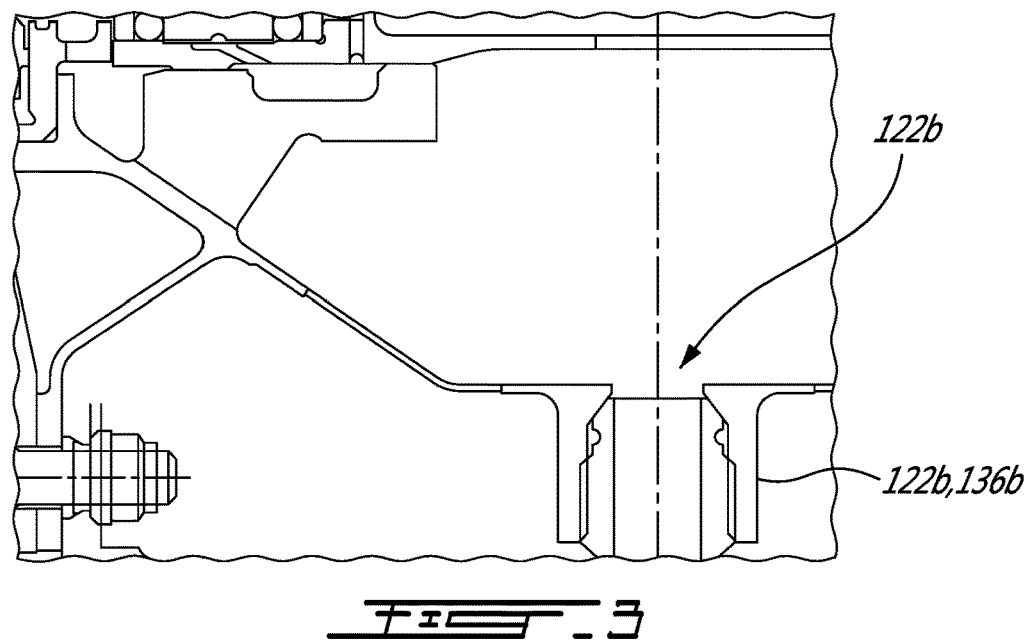
FIG. 3 is an enlarged view of a portion of FIG. 2.
Figure 4:
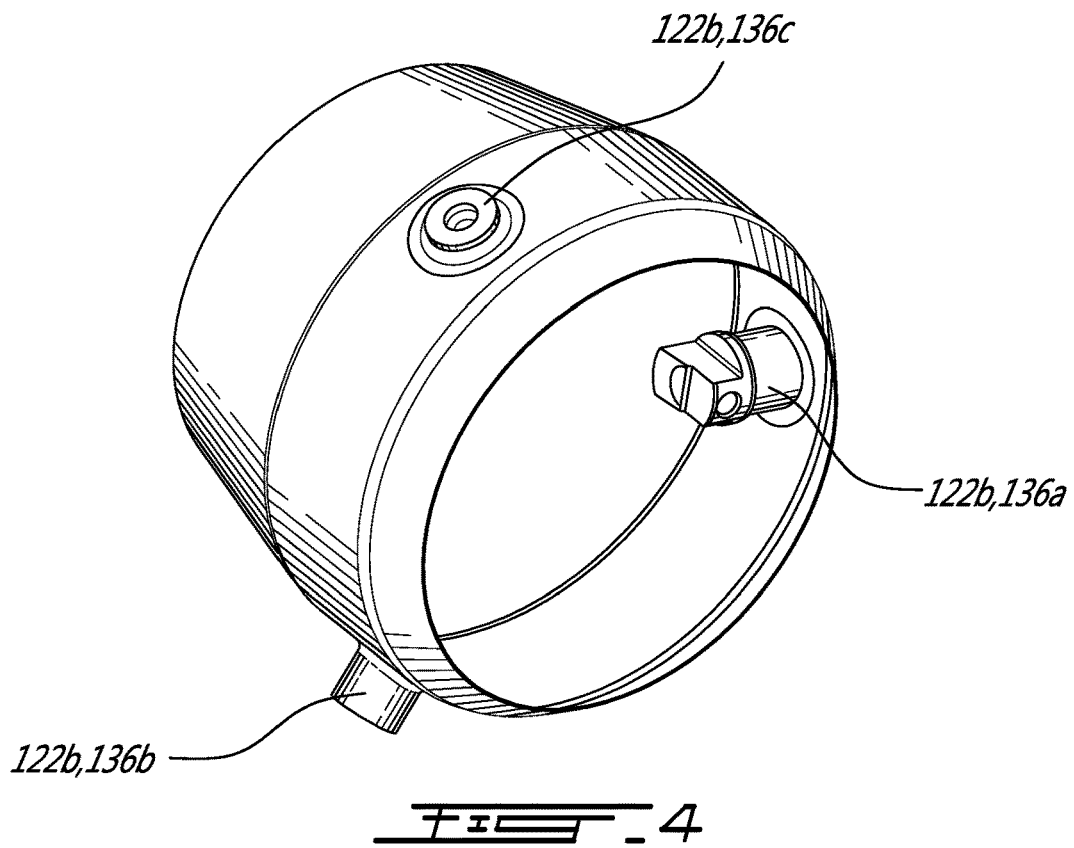
FIG. 4 is a schematic three-dimensional view of a bearing housing of the gas turbine engine of FIG. 1 in accordance with one embodiment.
Figure 5:
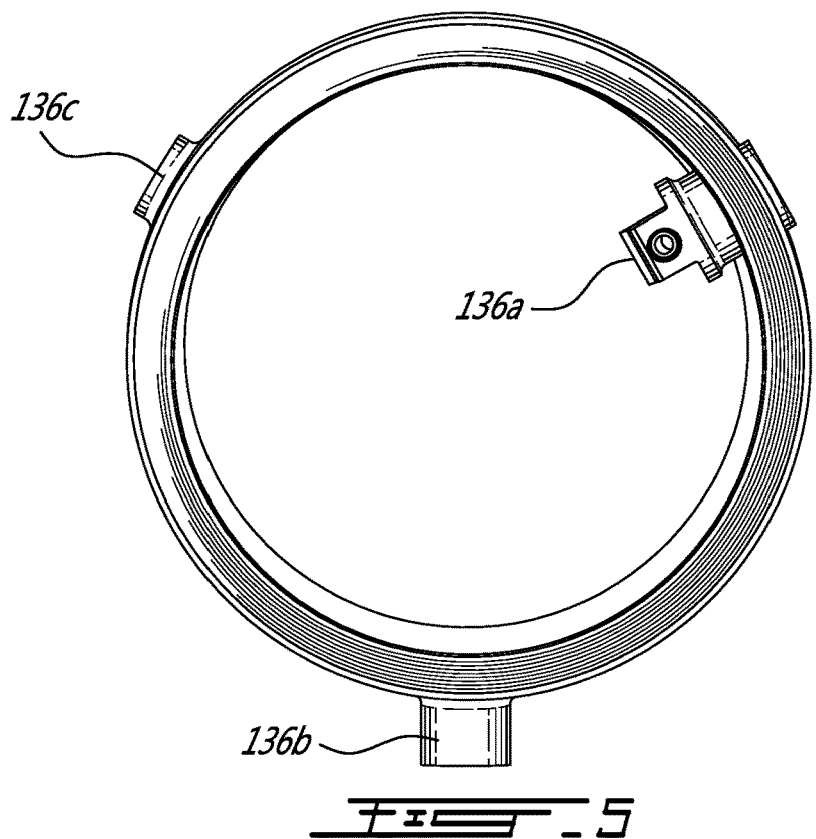
FIG. 5 is a front view of the bearing housing of FIG. 4.

As shown more clearly on FIGS. 3 and 5, the oil scavenging boss 136b is located at a lower portion of the case 122 such that lubricant may flow naturally by gravity toward the oil scavenging boss 136b and the corresponding one of the apertures 122b.

Referring back to FIGS. 2-3, the two case sections 122a slope radially outwardly toward the joint 132. The oil scavenging boss 136b may be located proximate to the joint 132 such that oil flows naturally against the case sections 122a toward the oil scavenging boss 136b by gravity.

For operating the bearing assembly 100, a first axial load is received at least at one of the at least two bearings 110 and a second axial load greater than the first axial load is received at the other of the at least two of the bearings; the case is bent to axially move the at least two bearings relative to one another relative to the central axis as a result of a difference between the first axial load and the second axial load. In the depicted embodiment, bending the case 122 includes moving the joint 132 connecting the two case sections 122a of the case toward the central axis 11.

The disclosed bearing housing 120 might allow for an axial thermal displacement in relation to the casing 28 of the engine 10. In a particular embodiment, the disclosed housing 120 allows for a dual bearing housing hairpin connection that support at least two bearings 110 in a single housing 120. Having the bosses 136 evenly distributed might allow for an uniform stress distribution all around the bearing housing 120.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A gas turbine engine comprising a bearing housing having at least two bearing supports axially spaced from one another relative to a central axis, the bearing housing having a case between the at least two bearing supports, the case having a joint configured for relative axial movement between the at least two bearing supports.

2. The bearing assembly of claim 1, wherein the joint comprises flexible sheet metal portions.

3. The bearing assembly of claim 1, wherein the joint is defined by a kink in the case of the bearing housing located between the at least two bearing supports.

4. The bearing assembly of claim 3, wherein the kink is created by an intersection of two frustoconical case sections of the case providing a non-zero angle between the two frustoconical case sections.

5. The bearing assembly of claim 4, wherein the kink is a radially-outward most location of the case, the joint, in use, radially moving toward the central axis upon an increase of an axial distance between the at least two bearing supports.

6. The bearing assembly of claim 1, further comprising at least two securing members each being axially aligned with a respective one of the at least two bearing supports relative to the central axis, the securing members secured to a casing of the gas turbine engine.

7. The bearing assembly of claim 1, wherein the case defines apertures for receiving bosses, the apertures being circumferentially equidistantly distributed about the central axis.

8. The bearing assembly of claim 7, wherein each of the apertures is engaged by a respective one of an oil feed boss configured to be fluidly connected to a lubricant system of the gas turbine engine and for injecting lubricant in a bearing cavity, an oil scavenging boss for draining used lubricant out of the bearing cavity, and a non-functional boss.

9. The bearing assembly of claim 1, wherein the case is axisymmetric relative to the central axis.

10. A gas turbine engine comprising a shaft rotatable about a central axis, the shaft supported by at least two bearings supported by at least two bearing supports of a bearing housing, the bearing housing having a case including an elbow section located between the at least two bearing supports, the case forming a joint allowing relative axial movement between the at least two bearing supports.

11. The gas turbine engine of claim 10, wherein the case is axisymmetric relative to the central axis.

12. The gas turbine engine of claim 10, wherein the joint comprises a flexible sheet metal portion.

13. The gas turbine engine of claim 10, wherein the joint is defined by a kink in a case of the bearing housing located between the at least two bearing supports.

14. The gas turbine engine of claim 13, wherein the kink is created by intersection of two frustoconical case sections of the case providing a non-zero angle between the two frustoconical case sections.

15. The gas turbine engine of claim 13, wherein the kink is a radially-outward most location on the case, the joint, in use, radially moving toward the central axis upon an increase of an axial distance between the at least two bearing supports.

16. The gas turbine engine of claim 10, further comprising at least two securing members each being axially aligned with a respective one of the at least two bearing supports relative to the central axis, the securing members secured to a casing of the gas turbine engine.

17. The gas turbine engine of claim 10, wherein the case defines apertures for receiving bosses, the apertures being circumferentially equidistantly distributed about the central axis.

18. The gas turbine engine of claim 17, wherein each of the apertures is engaged by a respective one of an oil feed boss configured to be fluidly connected to a lubricant system of the gas turbine engine and for injecting lubricant in a bearing cavity, an oil scavenging boss for draining used lubricant out of the bearing cavity, and a non-functional boss.

19. A method of operating a bearing assembly for a gas turbine engine, comprising:
   supporting at least two bearings being axially spaced apart relative to a central axis;
   receiving a first axial load at least at one of the at least two bearings and receiving a second axial load greater than the first axial load at the other of the at least two of the bearings; and
   bending a case interconnecting the at least two bearings to axially move the at least two bearings relative to one another relative to the central axis as a result of a difference between the first axial load and the second axial load.

20. The method of claim 19, wherein bending the case includes moving a joint connecting two case sections of the case toward the central axis.

* * * * *